United States Patent
Gordon et al.

(10) Patent No.: US 10,933,528 B2
(45) Date of Patent: Mar. 2, 2021

(54) AUTONOMOUS ROBOTIC MONITOR FOR ALERTING OF HAZARDS

(71) Applicant: International Business Machines Corporation, Armonk, NY (US)

(72) Inventors: Michael S. Gordon, Yorktown Heights, NY (US); James R. Kozloski, New Fairfield, CT (US); Ashish Kundu, Elmsford, NY (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 349 days.

(21) Appl. No.: 16/028,591

(22) Filed: Jul. 6, 2018

(65) Prior Publication Data
US 2020/0009732 A1    Jan. 9, 2020

(51) Int. Cl.
*B25J 9/16*     (2006.01)
*G08B 21/18*   (2006.01)
*B25J 11/00*   (2006.01)

(52) U.S. Cl.
CPC ........... *B25J 9/1666* (2013.01); *B25J 9/1697* (2013.01); *B25J 11/008* (2013.01); *G08B 21/182* (2013.01)

(58) Field of Classification Search
CPC .............. B25J 9/16; B25J 11/00; G08B 21/18
See application file for complete search history.

(56) References Cited

U.S. PATENT DOCUMENTS

| | | | |
|---|---|---|---|
| 4,638,445 A | 1/1987 | Mattaboni | |
| 7,769,490 B2 | 8/2010 | Abramson | |
| 8,682,726 B2 | 3/2014 | Hoffberg | |
| 9,633,283 B1* | 4/2017 | Zhu | G06T 1/20 |
| 9,689,696 B1* | 6/2017 | Russell | B25J 9/1666 |
| 2007/0063875 A1 | 3/2007 | Hoffberg | |
| 2008/0129541 A1 | 6/2008 | Lu | |
| 2011/0002507 A1* | 1/2011 | Kuoch | B60R 21/0134 |
| | | | 382/103 |
| 2011/0178635 A1 | 7/2011 | Anderson | |
| 2015/0024235 A1 | 1/2015 | Gauntt | |
| 2015/0081444 A1 | 3/2015 | Hoffberg | |
| 2015/0088310 A1* | 3/2015 | Pinter | G06F 19/3418 |
| | | | 700/253 |
| 2016/0025500 A1 | 1/2016 | Hoffberg | |

(Continued)

OTHER PUBLICATIONS

Yared et al., "Ambient Technology to Assist Elderly People in Indoor Risks", Computers, 5(4), 22; https://doi.org/10.3390/computers5040022. 2016.

*Primary Examiner* — Kira Nguyen
(74) *Attorney, Agent, or Firm* — Cantor Colburn LLP; Anthony Curro

(57) ABSTRACT

A computer-implemented method includes detecting, by one or more sensors of a robot, one or more characteristics of a current point on a surface on which the robot travels. A feature vector is constructed to describe the current point on the surface on which the robot travels, based on the one or more characteristics. The feature vector is mapped to a confidence level that a hazard exists at the current point on the surface. It is determined that the confidence level meets a threshold confidence. An alert is issued in association with the current point on the surface, based on the confidence level meeting the threshold confidence.

20 Claims, 4 Drawing Sheets

(56) References Cited

U.S. PATENT DOCUMENTS

| | | |
|---|---|---|
| 2016/0170412 A1 | 6/2016 | Yamamoto |
| 2016/0239649 A1* | 8/2016 | Zhao .................... G06F 21/316 |
| 2017/0132931 A1 | 5/2017 | Hoffberg |
| 2017/0176192 A1 | 6/2017 | Cardoso De Moura |
| 2018/0336399 A1* | 11/2018 | Gernoth ............. G06K 9/00255 |
| 2019/0018420 A1* | 1/2019 | Yee ....................... A47L 9/2852 |

* cited by examiner

AUTONOMOUS ROBOTIC MONITOR FOR ALERTING OF HAZARDS

BACKGROUND

The present invention relates to autonomous robots and, more specifically, to an autonomous robotic monitor for alerting of hazards.

Every year, one out of every three adults aged 65 or older falls. Falling can cause serious consequences. Over 540,000 slip-and-falls requiring hospitalization occur in the United States every year. The average cost of a slip-and-fall is $22,800 per accident. Slip-and-falls occur at home as well as on the job, and in the latter case, an employer may be responsible for the medical bills. In either case, the person who falls may require time, effort, and expense to recuperate.

SUMMARY

Embodiments of the present invention are directed to a computer-implemented method for detecting hazards. A non-limiting example of the computer-implemented method includes detecting, by one or more sensors of a robot, one or more characteristics of a current point on a surface on which the robot travels. A feature vector is constructed to describe the current point on the surface on which the robot travels, based on the one or more characteristics. The feature vector is mapped to a confidence level that a hazard exists at the current point on the surface. It is determined that the confidence level meets a threshold confidence. An alert is issued in association with the current point on the surface, based on the confidence level meeting the threshold confidence.

Embodiments of the present invention are directed to a system for detecting hazards. A non-limiting example of the system includes a memory having computer-readable instructions and one or more processors for executing the computer-readable instructions. Through executing the computer-readable instructions, the one or more processors are caused to detect, by one or more sensors of a robot, one or more characteristics of a current point on a surface on which the robot travels. The one or more processors are further caused to construct a feature vector describing the current point on the surface on which the robot travels, based on the one or more characteristics. The feature vector is mapped to a confidence level that a hazard exists at the current point on the surface. It is determined that the confidence level meets a threshold confidence. An alert is issued in association with the current point on the surface, based on the confidence level meeting the threshold confidence.

Embodiments of the invention are directed to a computer-program product for detecting hazards, the computer-program product including a computer-readable storage medium having program instructions embodied therewith. The program instructions are executable by a processor to cause the processor to perform a method. A non-limiting example of the method includes detecting, by one or more sensors of a robot, one or more characteristics of a current point on a surface on which the robot travels. Further according to the method, a feature vector is constructed to describe the current point on the surface on which the robot travels, based on the one or more characteristics. The feature vector is mapped to a confidence level that a hazard exists at the current point on the surface. It is determined that the confidence level meets a threshold confidence. An alert is issued in association with the current point on the surface, based on the confidence level meeting the threshold confidence.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
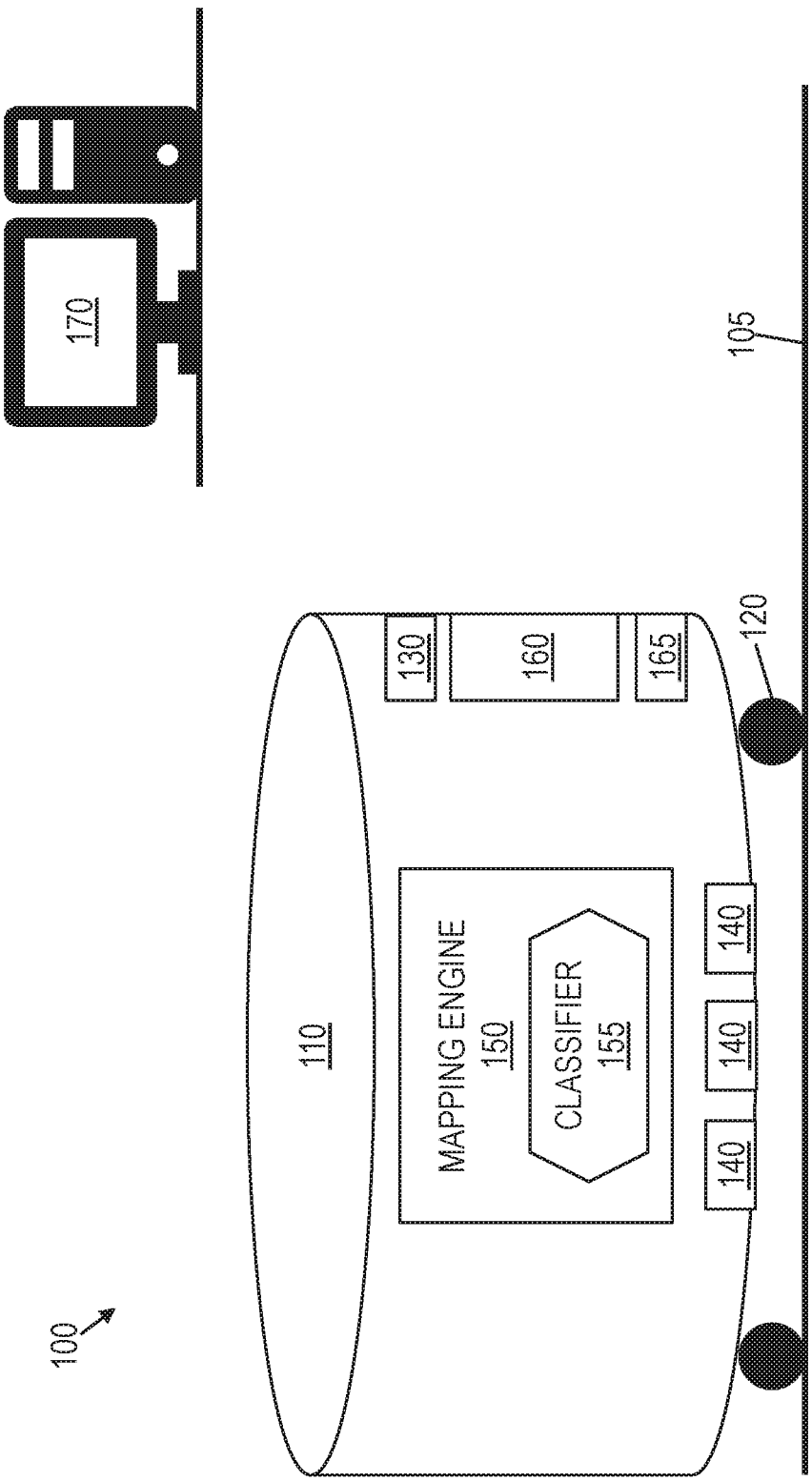
FIG. 1 is a diagram of a detection system according to some embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, autonomous robots are in use to perform tasks without direct human supervision. For instance, Roomba® is a series of autonomous robotic vacuum cleaners, and Scooba® is a series of robotic floor cleaners. Both of these, along with others, include sensors that enable autonomous operation while moving across a floor and cleaning. Specifically, these autonomous robots incorporate sensors that detect, at least, dirt, walls, and steep drops. However, because these autonomous robots are built for cleaning, they are not configured to detect and provide alerts about the presence of hazardous conditions.

Turning now to an overview of the aspects of the invention, one or more embodiments of the invention address the above-described shortcomings of the prior art by enabling an autonomous robot to detect potential hazards and issue alerts upon such detection. Specifically, an autonomous robot, such as a Roomba, Scooba, or other device, may be fitted with various sensors, such as one or more of the following: a tribometer, an accelerometer, a camera, and a hydrometer. Based on data generated by these sensors at a given point on a surface, a feature vector may be built describing that point. Supervised learning may be used to train a classifier to map feature vectors to confidence levels, where a confidence level describes a likelihood that a hazardous condition exists. After the training, the resulting mapping may be used to map a feature vector, associated with a point on the surface, to a confidence level for that point. If the confidence level exceeds a threshold confidence, then the autonomous robot may issue an alert. Further, the autonomous robot may remediate the potential hazard. To implement the invention, for example, an existing autonomous robot may be retrofitted with one or more additional sensors, and software enabling calculation of confidence levels may be installed, or a new autonomous robot may be built with appropriate sensors and software.

The above-described aspects of the invention address the shortcomings of the prior art by providing an autonomous robot having machine-learning-based cognitive capabilities that allow the autonomous robot to learn how to monitor for hazardous conditions. According to some embodiments of the invention, an improved autonomous robot may utilize its cognitive capabilities to evaluate and learn from sensor data to detect sensor data that can be classified as indicating potentially hazardous conditions. As such, alerts about the presence of potentially hazardous conditions can be generated and distributed.

Turning now to a more detailed description of aspects of the present invention, FIG. 1 is a block diagram of a detection system 100 according to some embodiments of the invention. Some or all operations of the detection system 100 may be performed by a robot 110, where the robot 110 is a device capable of autonomously moving across a surface 105, such as a floor, without interference by a human. For example, and not by way of limitation, the robot 110 may be a Roomba, a Scooba, a Shark® Ion Robot, some other existing robotic device, or a new robotic device. Generally, the robot 110 may include a transportation system 120, a communication device 130, one or more sensors 140, a mapping engine 150, an alert system 160, and a remediation system 165. In some embodiments of the invention, the robot 110 is manufactured for a task (e.g., cleaning) other than monitoring for hazards. Thus, it may be case that a subset of the sensors 140 are retrofitted to the robot 110 after manufacture and are not required for the original purpose (e.g., cleaning) for which the robot 110 was manufactured. Alternatively, however, the robot 110 may have been originally built to detect hazards as described herein.

In some embodiments of the invention, the detection system 100 may further include a console 170, through which a human or an automated user may manage the robot 110, and to which the robot 110 may issue remote alerts. The console 170 may be a general-purpose or special-purpose computing device, such as the computer system 400 shown in FIG. 4. At the robot 110, communications may be received from the console 170 and transmitted to the console 170 by way of the communication device 130.

In some embodiments of the invention, the robot 110 may work alone, without the console 170 and without other collaboration with a remote device, and in that case the communication device 130 need not be included. Alternatively, however, the communication device 130 may be a receiver, a transmitter, or a transceiver. The communication device 130 may utilize various communication technologies, such as WiFi, Bluetooth, or other wired or wireless communication technologies. The communication device 130 may enable the robot 110 to communicate with another robot 110 of this invention, with the console 170, or with another remote computing device that is not a robot 110. For instance, if multiple robots 110 are working together to monitor the surface 105 of a large space, such as a warehouse, then the robots 110 may share information. More specifically, as described below, a robot 110 may learn a mapping from feature vectors to confidence levels. This mapping may be shared between two or more robots 110 working together. For another example, the console 170 may be in communication with multiple robots 110 to share information, such as the mapping, among those multiple robots 110. For another example, as will be described further below, a robot 110 may transmit an alert to a remote location, such as the console 170, thus enabling a human or remote device that is not in the immediate physical presence of the robot 110 to know of a hazard. These communications or others may be performed by way of the communication device 130.

The transportation system 120 may enable the robot 110 to move across the surface 105 autonomously. For example, and not by way of limitation, the transportation system 120 may include motion-enabling hardware, such as one or more wheels, belts, or other devices that enable physical motion, along with software or hardware configured to instruct the motion-enabling hardware to move across the surface 105, possibly while navigating obstacles. Generally, the transportation system 120 may move the robot across the surface 105. One of skill in the art will understand how to implement a transportation system 120 that causes the robot 110 to move across the surface in such a way that the robot 110 and its sensors 140 are able to encounter a large overall portion of the surface 105 that is uncovered (e.g., by furniture). For example, and not by way of limitation, if the robot 110 is an existing autonomous robot for cleaning, then the robot 110 may already include a transportation system 120, including appropriate software enabling the robot 110 to move across the surface 105. Alternatively, if the robot is not an existing autonomous robot for cleaning, then the robot 110 may still utilize a similar transportation system 120 as such a robot for cleaning.

The sensors 140 may be carried by the robot 110. For example, and not by way of limitation, the sensors 140 may be hardware devices integrated with or otherwise attached to the robot 110, such that the sensors 140 move with the robot 110. Each sensor 140 may be able to detect a physical characteristic of the robot's surroundings, specifically with respect to a region of the surface 105 that is under or proximate to the robot 110. For example, and not by way of limitation, the one or more sensors 140 may include one or more of the following: a tribometer, an accelerometer, a hydrometer, and a camera. A tribometer detects friction and is thus useful in determining whether a surface is slippery. An accelerometer detects acceleration and is thus useful in determining a change in acceleration, which may be due to a change in pitch. A hydrometer detects the density of liquids and may thus be useful in describing whether a liquid is present as well as information about such a liquid. The robot 110 may include one or more cameras as sensors 140, which may include a traditional camera, a specialized camera, or both. For instance, when used a sensor 140, a traditional camera can detect obstacles. When used a sensor 140, a light detecting and ranging (Lidar) camera can detect distances to various objects around itself.

Generally, the sensors 140 may detect characteristics of a point or region of the surface 105, where these characteristics may or may not be indicative of a hazard. For instance, a hazard may be in the form of one or more of the following: slipperiness, water or other liquid, a raised bump, a gap, an object on the floor, a threshold between floor types, slanting, uneven surfaces, and a change in a floor characteristic since the last detection at the point or region. While the sensors 140 may be unable to detect these hazards directly, they may be able to detect characteristics indicative of these hazards. For example, and not by way of limitation, the sensors 140 may detect one or more of the following characteristics: low friction, a change in friction across a region, shininess or related optical characteristic, a change in shininess or optical characteristic across a region, an optical or tactile characteristic (e.g., which may suggest that a portion of the surface 105 is improperly raised or has a gap), a change since prior scan by the sensors 140, or a slope.

Generally, the output of the sensors 140 at a particular point or region may be used to construct a feature vector associated with that point or region. For example, and not by way of limitation, a feature vector may be a vector having a plurality of fields, where each field corresponds to a respective sensor 140. For instance, in a vector corresponding to a point or region, a field may have a value that is or represents the output of the respective sensor 140 at that point or region. Further, in some embodiments, a feature vector may incorporate changes since a prior scan by representing more than a single point of time. For instance, two or more fields of the feature vector may correspond to a respective sensor 140, where one of such fields represents the most recent detected value from the respective sensor 140, and each other of such fields represents a respective prior point in time. In this manner, a feature vector may represent not only a point or region at a current point in time, but also the same point or region at one or more prior points in time. In short, a feature vector may describe the point or region with which it is associated. As will be described further below, each feature vector may be mapped to a confidence level, which represents the likelihood of a hazard existing at the corresponding point or region.

Generally, a feature vector may correspond to a point or to a region at which features in the feature vector were detected. However, it will be understood that a region may be represented by a point. For example, a point at the center of a region may represent the region as a whole, or a point at a relative position within the region may represent the region as a whole. Thus, when this disclosure refers to a feature vector being associated with a point, it will be understood that the feature vector may in fact describe a region represented by the point. More specifically, in some embodiments of the invention, the sensors 140 may detect characteristics of a region, and those characteristics may be constructed into a feature vector, which may then be associated with a point representing the region. When a confidence level is determined based on that feature vector, that confidence level may be deemed applicable to the representative point as well as to the region as a whole. Thus, if the confidence level suggests that a hazard is likely, the hazard may be deemed likely for the entire region represented by the point for which the confidence level was determined. As a result, while a surface 105 may theoretically contain an infinite number of points, in some embodiments of the invention, the surface 105 is separated into regions for consideration, and such regions may be referred to as points in this disclosure.

In some embodiments of the invention, the detection system 100 may apply a greater level of sensitivity, or consideration, or vigilance, to some regions as compared to others on the surface. The confidence level of a point on the surface 105 may be based, at least in part, on the sensitivity level assigned to that point. In some embodiments of the invention, each point or region on the surface 105 is associated with a sensitivity level. A default sensitivity level may apply to each point or region, until the sensitivity level is updated. Sensitivity levels may change based on historical slip-and-fall occurrences, risk-averseness, or other reasons. In short, in some embodiments of the invention, the detection system 100 may learn an appropriate sensitivity level for the various regions of the surface 105. Further, the sensitivity level may play a role in determining whether a hazard is identified, such as by being incorporated into confidence level calculation, adjusting the threshold confidence for determining a hazard, determining which sensors 140 are active, or determining how frequently a region is visited and analyzed.

For example, if it was previously determined that a fall occurred at a first region of a surface, or that the confidence level at a first region of the surface exceeded a sensitivity threshold, then the detection system 100 may assign a relative high sensitivity level to the region. Various mechanisms may be used to detect where a fall occurred. For example, and not by way of limitation, this information may be entered into the detection system 100 manually, such as by way of the console 170. Various actions may be taken to ensure that alerts are issued in a timely manner with respect to a region with a high sensitivity level. For example, for a region being given high sensitivity, the robot 110 may be directed to return to the region more often than the robot is directed to return to a region with low sensitivity. More generally, the frequency with which the robot 110 returns to a region, to generate an updated feature vector and corresponding confidence level, may depend at least in part on the sensitivity level assigned to that region.

For another example, to conserve power, it need not be the case that all sensors 140 are active all the time. However, if a region's sensitivity level is deemed high, then one or more sensors 140 that were inactive may be activated for detection within the region. Thus, in some cases, a feature vector may have blank fields, due to a sensor 140 being deactivated, but a feature vector corresponding to a region with a high confidence level may have more fields with valid values than may a feature vector corresponding to a region with a low confidence level. More generally, whether a particular sensor 140 is activated or deactivated may depend, at least in part, on a sensitivity of the current region being evaluated by the sensors 140.

The mapping engine 150 may map feature vectors to confidence levels, where each confidence level indicates the likelihood of a hazard. The mapping engine 150 may include hardware or software, or a combination of both. For instance, the mapping engine may include one or more software modules or one or more specialized hardware circuits. The mapping engine 150 may be, or may include, a classifier 155. For example, and not by way of limitation, the classifier 155 may be a support vector machine, a decision tree, a boosted tree, a random forest, a neural network, or some other classification or learning model. Through learning, which may be supervised learning, the classifier 155 may learn a mapping from feature vectors to confidence levels. After training of the classifier 155, the mapping engine 150 may apply the classifier 155 to each feature vector describing a point on the surface 105, thereby mapping the feature vector to a corresponding confidence level indicating a likelihood that the point on the surface presents a hazard.

Figure 2:
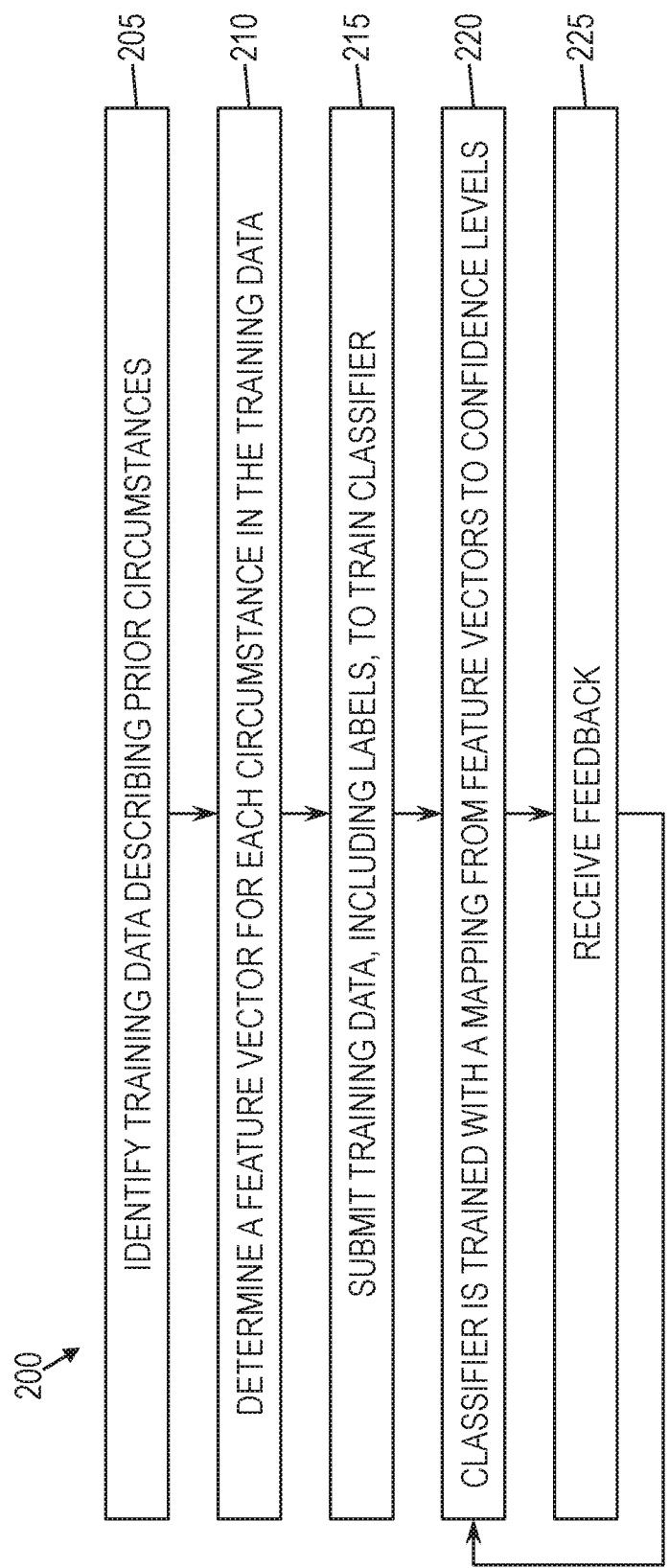
FIG. 2 is a flow diagram of a method for training a classifier to identify likelihoods of hazards, according to some embodiments of the invention.

FIG. 2 is a flow diagram of a method 200 for training the classifier 155 to identify likelihoods of hazards, by mapping feature vectors to confidence levels, according to some embodiments of the invention. The mapping need not be a one-to-one mapping. Rather, each feature vector may map to a single confidence level, but a confidence level may be mapped to by one or more feature vectors, or by no feature vectors. In some embodiments of the invention, the training occurs locally, at the robot 110. Alternatively, however, the training may occur remotely, and the resulting mapping may be received by way of the communication device 130 of the robot 110. Thus, in some embodiments of the invention, the robot 110 has access to the mapping and, after the training, is capable of locally mapping feature vectors to confidence levels to identify hazards. Alternatively, however, the robot 110 may be configured to perform detection, by way of the sensors, and both training and mapping may occur remotely. In this case, the mapping engine 150 may be located remotely, such as at the console 170. One of skill in the art will understand that various configurations of duties are possible and in accordance with embodiments of the invention.

As shown in FIG. 2, at block 205 of the method 200 for training the classifier 155, training data may be identified. The training data may include, at least, labeled information about prior circumstances. The prior circumstances need not be real, historical data. Rather, a prior circumstance may represent a hypothetical case, such as one determined by experts or based on laboratory experimentation to identify hazards. The prior circumstances may include at least one hazard and at least one non-hazard, and each prior circumstance may be labeled as either a hazard or a non-hazard. In some embodiments of the invention, the label of each prior circumstance may be a value within a range, such as the inclusive range [0, 1]. In that case, a hazard may be associated with a label of 1, an absolute non-hazard may be associate with a label of 0, and each potential hazard may be labeled according to the likeliness of being a hazard. In other words, each prior circumstance may be labeled with the likelihood of the prior circumstance representing a hazard. This labeling may be performed manually, for example, such as by a human submitting this information to the console 170.

At block 210, a feature vector may be determined for each prior circumstance in the training data, and that feature vector may be incorporated into the training data. For each prior circumstance, the training data may include enough information to identify an associated feature vector. For example, and not by way of limitation, the training data may simply include one or more feature vectors describing points at which the prior circumstances existed. If an actual feature vector is not provided for a prior circumstance, then the detection system 100 may seek to construct the applicable feature vector and may then add the constructed feature vector to the training data. For instance, the training data may include a point on the surface 105 as well as a time of the prior circumstance. In that case, historical data from the sensors 140 may be examined to identify a feature vector corresponding to that point at that time. Thus, either by original inclusion or by construction, the training data may include a feature vector associated with each prior circumstance, as well as knowledge of the likelihoods that each such feature vector represents a hazard.

At block 215, the training data may be submitted to the classifier 155 for training of the classifier 155 by way of machine learning. Specifically, for each feature vector in the training data, the corresponding feature vector and label (e.g., hazard likelihood) may be submitted to the classifier 155 for training.

At block 220, as a result of the training data, the classifier 155 is trained, resulting in an established mapping from feature vectors to confidence levels, where a confidence level represents the likelihood of a hazard. In some embodiments of the invention, a logistic regression model is used for the training, because this is a predictive classifier 155 that suits the scale and characteristics of the feature vectors described in this disclosure. The training data may thus be used to train coefficients representing the features of the feature vectors. However, it will be understood that other classifiers 120 may also be used, such as a support vector machine, a decision tree, a boosted tree, a random forest, or a neural network.

In some embodiments of the invention, after initial training, the classifier 155 learns from new training data provided to it. Thus, at block 225, feedback may be received to be used as new or updated training data for the classifier 155. Generally, this feedback may include one or more feature vectors and corresponding confidence levels, or likelihoods of hazards. Feedback may be received, for instance, when a human reviews confidence levels generated by the mapping engine 150 and makes modifications to those confidence levels. In this case, each updated confidence level and associated feature vector may be submitted to the classifier 155 as new training data. Upon receipt of this feedback, the classifier 155 may be updated at block 220, through retraining or fine-tuning, thus enabling the classifier 155 to update its mapping.

After training of the mapping engine 150, the mapping engine 150 may be capable of mapping a feature vector to a confidence level. More specifically, as the robot 110 moves, the sensors 140 may take readings, which may be incorporated into feature vectors, which may be mapped to confidence levels. This may be an ongoing process as the robot 110 moves. For instance, if the robot 110 is moving in a continuous manner, then the sensors 140 may provide a stream of continuous output, which may be continuously formed into feature vectors and mapped to confidence levels. Alerts may be issued each time it is determined that a hazard is likely to exist, based on a high confidence level being determined. Further, remediation may be performed to reduce or eliminate the potential hazard.

Figure 3:
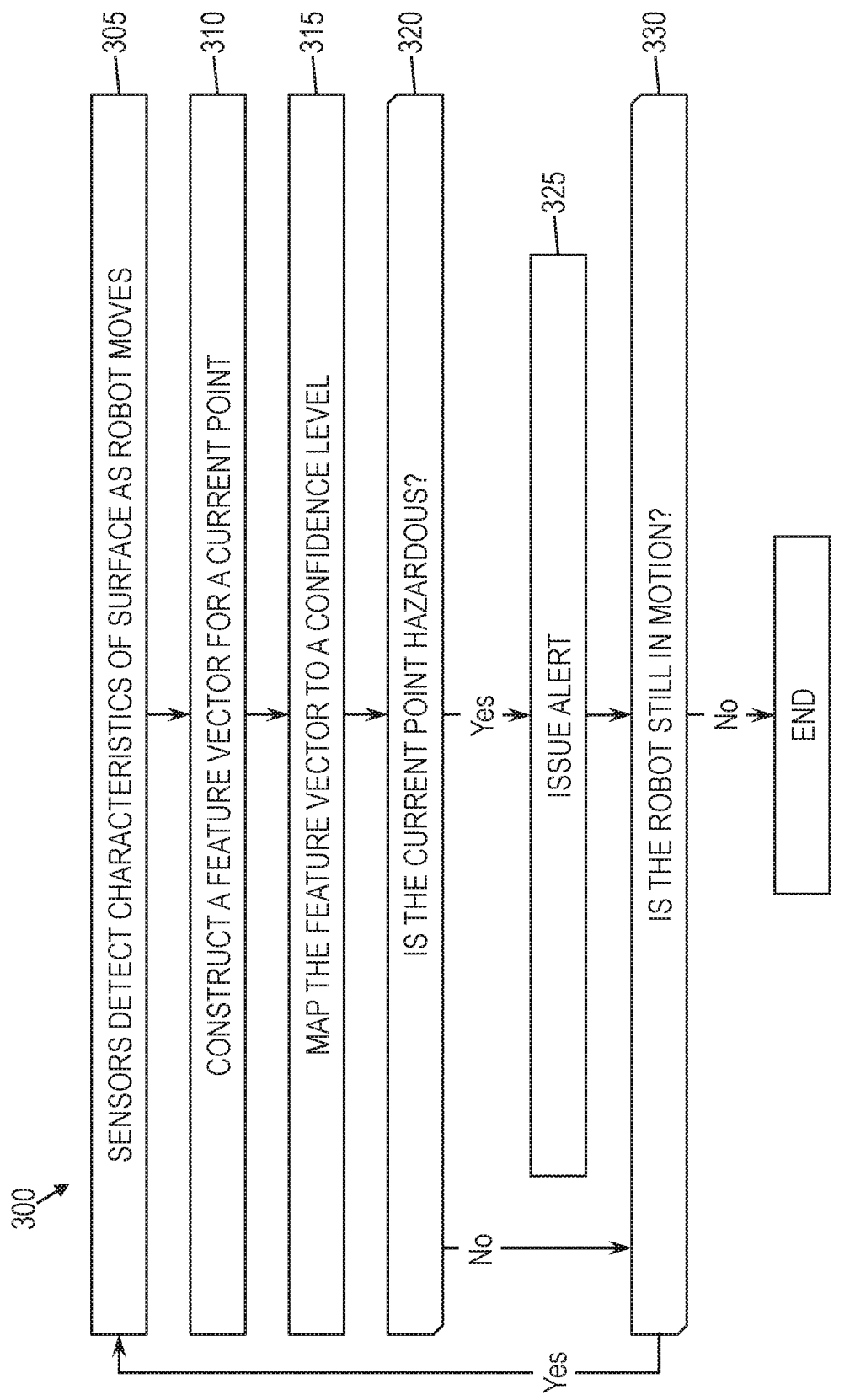
FIG. 3 is a flow diagram of a method for detecting hazards, according to some embodiments of the invention.

FIG. 3 is a flow diagram of a method for detecting hazards on a surface, according to some embodiments of the invention. This method 300 may use the classifier 155 that was previously trained.

At block 305, as the robot 110 is moving across the surface (e.g., in the process of cleaning the surface 105, or the process of detecting hazards), the sensors 140 may detect a plurality of characteristics about the surface 105 at a current point, or at a current region represented by a current point. At block 310, a feature vector may be constructed based on the detected characteristics, such that the feature vector describes the current point.

At block 315, the feature vector may be mapped to a confidence level, according to the trained classifier 155. The resulting confidence level may represent the likelihood that a hazard exists at the current point.

At decision block 320, it may be determined whether the current point is hazardous (i.e., likely contains a hazard). For example, and not by way of limitation, if the confidence level meets (e.g., equals or exceeds) a threshold confidence, then the current point corresponding to the confidence level may be deemed hazardous. If the current point is deemed hazardous, then at block 325, an alert may be issued in association with the current point. For example, this alert may be physical (e.g., a cone automatically being placed at or near the current point) or digital (e.g., a notification being sent with reference to the current point). Further, remediation may be performed to reduce the hazard. For example, and not by way of limitation, the robot 110 may include one or more tools for cleaning, and the robot 110 may thus clean a region of the current point in an attempt to reduce the hazard.

Blocks 305 through 325 may be performed continuously, or repeatedly, as the robot 110 moves across the surface. At decision block 330, it may be determined whether the robot 110 is in motion. If so, then the method 300 may return to block 305 to continue detecting characteristics of the surface 105. However, if the robot 110 is not in motion, then the method 300 may end or may pause until motion resumes.

As mentioned above, based on the confidence levels determined across the surface 105, alerts may be issued. In some embodiments of the invention, the alert system 160 issues these alerts, which may notify a user of hazardous points on the surface. In some embodiments of the invention, a point is deemed hazardous if the confidence level determined for that point meets a threshold confidence. For example, the threshold confidence may be a default value or a value that has been updated automatically or manually. In some embodiments of the invention, the threshold confidence may be dynamic and may be based on occupation of the surface. For example, if a large number of people occupy the surface, then a relatively low threshold confidence may be established, so as to avoid hazards even at the risk of over-alerting. If an elderly or disabled person occupies the surface, then a relative low threshold confidence may be established as these people may be more sensitive to hazards than younger or able-bodied people. In contrast, if no one or a small number of people occupy the surface, then the threshold confidence may be set relatively high, as the risk of a person actually encountering a hazard on the surface may be lower in this case. In some embodiments of the invention, the detection system 100 may use cameras or other devices to detect the number of people in the room, and the threshold confidence may be updated accordingly.

When a hazard is identified (e.g., when a confidence level is determined to meet the threshold confidence), then the alert system 160 may issue an alert. This alert may take various forms, which may be physical or digital, or both. For example, and not by way of limitation, the alert system 160 may be equipped with physical objects, such as cones, and may be able to place a physical object at or near a point deemed hazardous. In addition to the current robot 110 that identified the hazard, if there are one or more other robots 110 working on the surface 105, or otherwise nearby, the current robot 110 may collaborate with the one or more other robots 110 to alert of the hazard or to remediate the hazard. For example, the current robot 110 may request the assistance of such other robots 110. If another robot 110 is idle or doing lower-priority work, that other robot 110 may join the current robot 110 in detecting a full area of the hazard, which may cover multiple regions, or in marking the periphery of that area with physical objects. For another example, the alert system 160 may issue an audible alarm at or near the hazardous point, or may transmit a digital notification indicating the location of the hazardous point. In some embodiments of the invention, when the alert is implemented by transmission to a remote device, such as the console 170, this transmission may occur by way of the communication device 130 on the robot 110.

In some embodiments of the invention, the alert system 160 may generate and maintain a heatmap to illustrate the various confidence levels across the surface 105. For example, the heatmap may be divided into regions, each of which may be represented by a point for which a confidence level has been or will be generated. Each region may be colored, shaded, or otherwise tagged according to the confidence level of the representative point of that region. Thus, a user may view the heatmap to see an overview of the likelihood of hazards across the surface 105. The user may then use the heatmap to remediate these potential hazards. In some embodiments of the invention, the robot 110 utilizes the communication device 130 to transmit the heatmap to a remote location, such as the console 170, for examination by the user.

Further, in some embodiments of the invention, the remediation system 165 may attempt to remediate the hazard. For example, and not by way of limitation, the remediation system 165 may include, or may be in communication with, one or more cleaning tools of the robot 110. Thus, to remediate the hazard, the remediation system 165 may initiate cleaning at or around a point associated with a high confidence level, in order to potentially reduce the hazard. Further, as discussed above, one or more other robots 110 may assist the current robot 110 in cleaning the region of the hazard. In some embodiments of the invention, the remediation system 165 may detect the type of hazard (e.g., slippery floor, raised bump) based on output data from the sensors 140. Based on this output data, the remediation system 165 may determine whether cleaning would be helpful to reduce the hazard, and if so, this cleaning may be performed.

Figure 4:
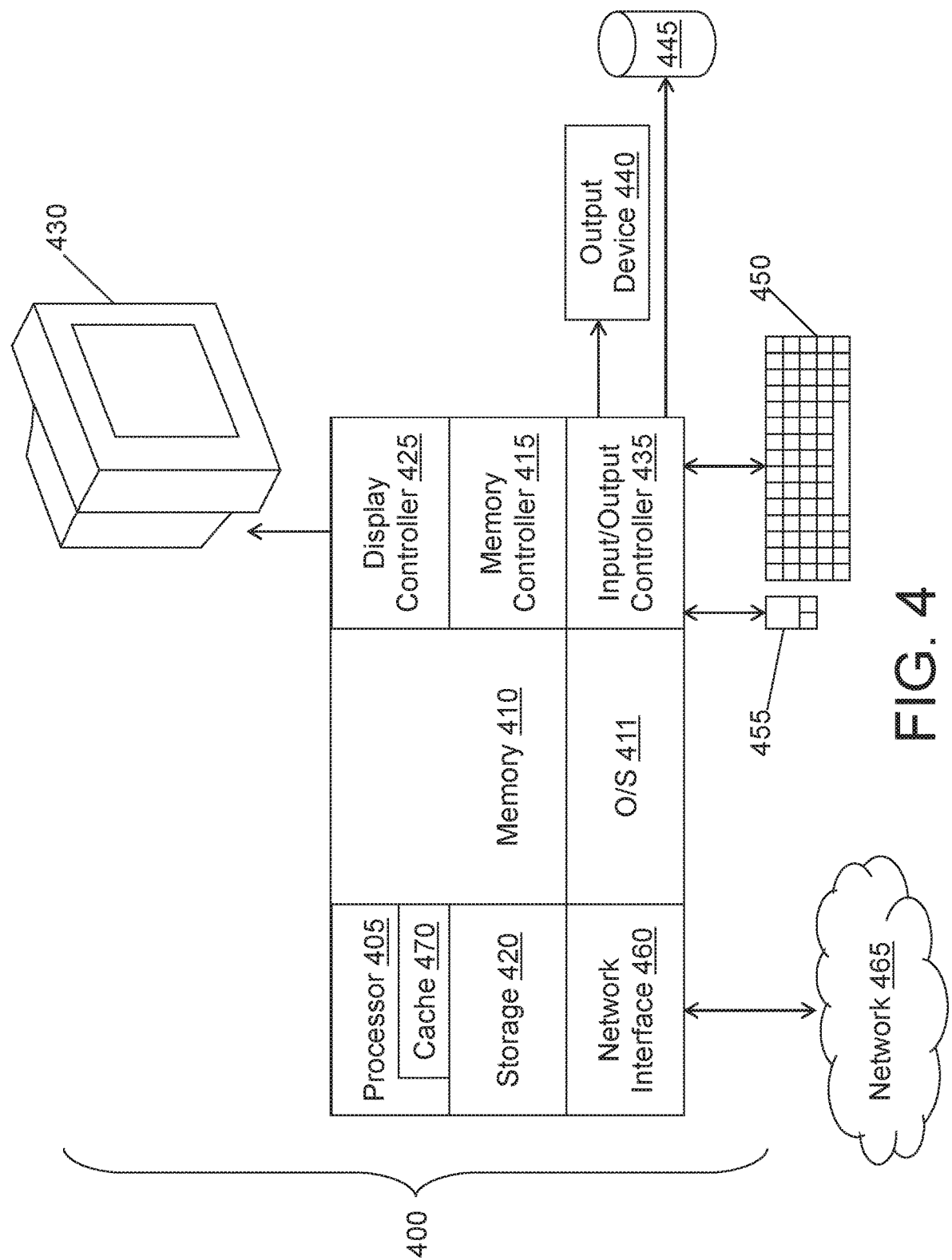
FIG. 4 is a block diagram of a computer system for implementing some or all aspects of the detection system, according to some embodiments of this invention.

FIG. 4 is a block diagram of a computer system 400 for implementing some or all aspects of the system, according to some embodiments of this invention. The detection systems 100 and methods described herein may be implemented in hardware, software (e.g., firmware), or a combination thereof. In some embodiments, the methods described may be implemented, at least in part, in hardware and may be part of the microprocessor of a special- or general-purpose computer system 400, such as a personal computer, workstation, minicomputer, or mainframe computer. For example, and not by way of limitation, the robot 110 or the console 170, or both, may be computer systems 400.

In some embodiments, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 400, a semiconductor-based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid-state drive. The stored instructions in memory 410 or in storage 420 may include those enabling the processor to execute one or more aspects of the detection systems 100 and methods of this disclosure.

The computer system 400 may further include a display controller 425 coupled to a display 430. In some embodiments, the computer system 400 may further include a network interface for coupling to a network 465. The network 465 may be an IP-based network for communication between the computer system 400 and an external server, client and the like via a broadband connection. The network 465 transmits and receives data between the computer system 400 and external systems. In some embodiments, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Detection systems 100 and methods according to this disclosure may be embodied, in whole or in part, in computer program products or in computer systems 400, such as that illustrated in FIG. 4.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for a robot comprising:
   detecting, by the robot, one or more characteristics of a current point on a surface on which the robot travels using one or more sensors of the robot; and
   determining, by the robot, a hazard on the surface on which the robot travels, the determining comprising:
      constructing a feature vector describing the current point on the surface on which the robot travels, based on the one or more characteristics;
      mapping the feature vector to a confidence level that the hazard exists at the current point on the surface;
      determining that the confidence level meets a threshold confidence; and
      issuing an alert associated with the current point on the surface, based on the confidence level meeting the threshold confidence; and
   remediating, by the robot, the hazard associated with the alert.

2. The method of claim 1, wherein mapping the feature vector to the confidence level comprises training a classifier to map feature vectors to confidence levels.

3. The method of claim 1, further comprising:
   assigning a sensitivity level to the current point on the surface; and
   activating, at the current point on the surface, an additional sensor of the robot, based on the sensitivity level assigned to the current point on the surface.

4. The method of claim 1, further comprising:
   assigning a sensitivity level to the current point on the surface; and
   determining a frequency at which the robot returns to the current point on the surface, based at least in part on the sensitivity level assigned to the current point on the surface.

5. The method of claim 1, wherein issuing the alert comprises placing, by the robot, a physical object on the surface.

6. The method of claim 5, wherein issuing the alert further comprises requesting that one or more other robots place one or more other physical objects on the surface.

7. The method of claim 1, wherein issuing the alert comprises generating a heatmap indicating a plurality of confidence levels of a plurality of points across the surface.

8. The method of claim 1, wherein the robot is a retrofitted cleaning robot.

9. An autonomous robot comprising:
   one or more sensors, the autonomous robot having computer-readable instructions configured to:
   detect one or more characteristics of a current point on a surface on which the autonomous robot travels using the one or more sensors; and
   determine a hazard on the surface on which the autonomous robot travels, the determine comprising:
      construct a feature vector describing the current point on the surface on which the autonomous robot travels, based on the one or more characteristics;
      map the feature vector to a confidence level that a hazard exists at the current point on the surface;
      determine that the confidence level meets a threshold confidence; and
      issue an alert associated with the current point on the surface, based on the confidence level meeting the threshold confidence.

10. The autonomous robot of claim 9, wherein, to map the feature vector to the confidence level, the computer-readable instructions further cause the one or more processors to train a classifier to map feature vectors to confidence levels.

11. The autonomous robot of claim 9, wherein the computer-readable instructions further cause the one or more processors to:
   assign a sensitivity level to the current point on the surface; and
   activate, at the current point on the surface, an additional sensor of the autonomous robot, based on the sensitivity level assigned to the current point on the surface.

12. The autonomous robot of claim 9, wherein the computer-readable instructions further cause the one or more processors to:
   assign a sensitivity level to the current point on the surface; and
   determine a frequency at which the autonomous robot returns to the current point on the surface, based at least in part on the sensitivity level assigned to the current point on the surface.

13. The autonomous robot of claim 9, wherein, to issue the alert, the computer-readable instructions further cause the one or more processors to place a physical object on the surface.

14. The autonomous robot of claim 9, wherein, to issue the alert, the computer-readable instructions further cause the one or more processors to generate a heatmap indicating a plurality of confidence levels of a plurality of points across the surface.

15. A computer-program product for detecting hazards, the computer-program product comprising a computer-readable storage medium having program instructions embodied therewith, the program instructions executable by a processor to cause the processor to perform a method comprising:
   detecting one or more characteristics of a current point on a surface on which the robot travels using one or more sensors of a robot; and
   determining a hazard on the surface on which the robot travels, the determining comprising:
      constructing a feature vector describing the current point on the surface on which the robot travels, based on the one or more characteristics;
      mapping the feature vector to a confidence level that a hazard exists at the current point on the surface;
      determining that the confidence level meets a threshold confidence; and
      issuing an alert associated with the current point on the surface, based on the confidence level meeting the threshold confidence.

16. The computer-program product of claim 15, wherein mapping the feature vector to the confidence level comprises training a classifier to map feature vectors to confidence levels.

17. The computer-program product of claim 15, the method further comprising:
   assigning a sensitivity level to the current point on the surface; and
   activating, at the current point on the surface, an additional sensor of the robot, based on the sensitivity level assigned to the current point on the surface.

18. The computer-program product of claim 15, the method further comprising:
   assigning a sensitivity level to the current point on the surface; and
   determining a frequency at which the robot returns to the current point on the surface, based at least in part on the sensitivity level assigned to the current point on the surface.

19. The computer-program product of claim 15, wherein issuing the alert comprises placing, by the robot, a physical object on the surface.

20. The computer-program product of claim 15, wherein issuing the alert comprises generating a heatmap indicating a plurality of confidence levels of a plurality of points across the surface.

* * * * *